US012699803B2

(12) United States Patent
Chittampally et al.

(10) Patent No.: US 12,699,803 B2
(45) Date of Patent: **\*Aug. 4, 2026**

(54) SCREEN SHARING SESSION PRIVACY MANAGER

(71) Applicant: Microsoft Technology Licensing, LLC, Redmond, WA (US)

(72) Inventors: Vasanth Raja Chittampally, Redmond, WA (US); Utkarsh Patankar, Telangana (IN)

(73) Assignee: Microsoft Technology Licensing, LLC, Redmond, WA (US)

( \* ) Notice: Subject to any disclaimer, the term of this patent is extended or adjusted under 35 U.S.C. 154(b) by 69 days.

This patent is subject to a terminal disclaimer.

(21) Appl. No.: 18/760,581

(22) Filed: Jul. 1, 2024

(65) Prior Publication Data

US 2024/0354444 A1 Oct. 24, 2024

Related U.S. Application Data

(63) Continuation of application No. 17/357,465, filed on Jun. 24, 2021, now Pat. No. 12,056,256.

(51) Int. Cl.
G06F 21/62 (2013.01)
G06F 21/60 (2013.01)
G06F 21/84 (2013.01)

(52) U.S. Cl.
CPC ........ G06F 21/6245 (2013.01); G06F 21/604 (2013.01); G06F 21/629 (2013.01); G06F 21/84 (2013.01)

(58) Field of Classification Search
CPC .. G06F 3/1454; G06F 21/604; G06F 21/6245; G06F 21/629; G06F 21/84; G09G 2358/00; H04L 67/14–141
See application file for complete search history.

(56) References Cited

U.S. PATENT DOCUMENTS

| | | | |
|---|---|---|---|
| 11,165,755 B1* | 11/2021 | Qian | H04N 5/272 |
| 2012/0154255 A1* | 6/2012 | Hinckley | G06F 3/0488 |
| | | | 345/1.3 |
| 2017/0024100 A1* | 1/2017 | Pieper | H04L 12/1827 |

\* cited by examiner

*Primary Examiner* — Kevin Bechtel
(74) *Attorney, Agent, or Firm* — Wade IP Law PLLC

(57) ABSTRACT

A screen sharing privacy manager performs method in response to initiating a screen sharing session on a computer network, in which the screen sharing session is of a first desktop environment of an operating system. A second desktop environment is generated with the operating system. The second desktop environment inaccessible to the screen sharing session. A selected item in the first desktop environment is moved to the second desktop environment based on a user profile.

20 Claims, 4 Drawing Sheets

SCREEN SHARING SESSION PRIVACY MANAGER

CROSS-REFERENCE TO RELATED APPLICATION(S)

This application is a continuation of U.S. patent application Ser. No. 17/357,465, entitled "Screen Sharing Session Privacy Manager" and filed Jun. 24, 2021, which is incorporated herein by reference in its entirety.

BACKGROUND

Screen sharing or desktop sharing are common names for technologies and products that allow real-time remote access and real-time remote collaboration on a computer desktop through computer application running on a computing device. For example, real-time collaboration is a component of rich multimedia communications that can create the notion of virtual space in which users can meet and work together. Screen sharing can provide remote observance or control of a user's desktop or screen on a computer network such as the internet amongst one or more users in the screen sharing session. Screen sharing applications can be standalone products and some collaboration applications or communication applications include built-in screen sharing features. Screen sharing applications can be configured as peer-to-peer model, client-server model, or some other or hybrid architecture.

SUMMARY

This summary is provided to introduce a selection of concepts in a simplified form that are further described below in the Description. This summary is not intended to identify key features or essential features of the claimed subject matter, nor is it intended to be used to limit the scope of the claimed subject matter.

The disclosure is directed to a mechanism to automatically hide predetermined sensitive items from a screen sharing session with other users over a computer network. Users working with sensitive items or having sensitive items open or running on a desktop environment may inadvertently reveal private data to remote parties in a screen session. Typically, users manually close, or intend to manually close, sensitive items before screen sharing, but intentions are susceptible to forgetting to close hidden items that may be behind windows or other open items or a user may lose track of work progress on closed items.

A screen session privacy manager provides a user the ability to select items, such as applications, files, documents, or categories of applications, files, and documents, that may contain sensitive applications that a user may wish to keep hidden from screen sharing sessions. In response to initiating a screen sharing session in a primary desktop environment, the privacy manager can determine if any of the preselected items are open in the primary desktop environment, and, if so, create a secondary desktop environment which is inaccessible to the screen sharing session, and move the preselected applications to the secondary desktop environment. Once the sensitive items are moved, a communication service can share the primary desktop with other users in a screen sharing session. The items remain running but are hidden from screen sharing. Once the screen sharing session is terminated, the secondary desktop environment can be merged with the primary desktop environment, such as the secondary desktop environment can be closed and its items are moved back to the primary desktop. The screen sharing privacy manager can employ the operating system to create and merge the secondary desktop environment and move the sensitive items.

In one example, the screen sharing privacy manager can provides a user with a list of categories and specific items that can be selected to be hidden if open on the primary desktop when the screen sharing session is initiated. The list of items and conditions of the sensitivity can be stored in a user profile of the screen sharing privacy manager. The user can edit the list prior to initiating the screen sharing session, and can be saved in memory. Additionally, the screen sharing privacy manager can apply machine learning to the list, as well as to other user actions prior to initiating the screen sharing session to provide suggestions as to which items to hide in the secondary desktop.

In one example, a method is performed in response to initiating a screen sharing session on a computer network, in which the screen sharing session is of a first desktop environment of an operating system. A second desktop environment is generated with the operating system. The second desktop environment inaccessible to the screen sharing session. A selected item in the first desktop environment is moved to the second desktop environment based on a user profile.

BRIEF DESCRIPTION OF THE DRAWINGS

The accompanying drawings are included to provide a further understanding of embodiments and are incorporated in and constitute a part of this disclosure. The drawings illustrate embodiments and together with the description serve to explain principles of embodiments. Other embodiments and many of the intended advantages of embodiments will be readily appreciated, as they become better understood by reference to the following description. The elements of the drawings are not necessarily to scale relative to each other. Like reference numerals designate corresponding similar parts.

DESCRIPTION

In the following Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following description, therefore, is not to be taken in a limiting sense. It is to be understood that features of the various example embodiments described herein may be combined, in part or whole, with each other, unless specifically noted otherwise.

Figure 1:
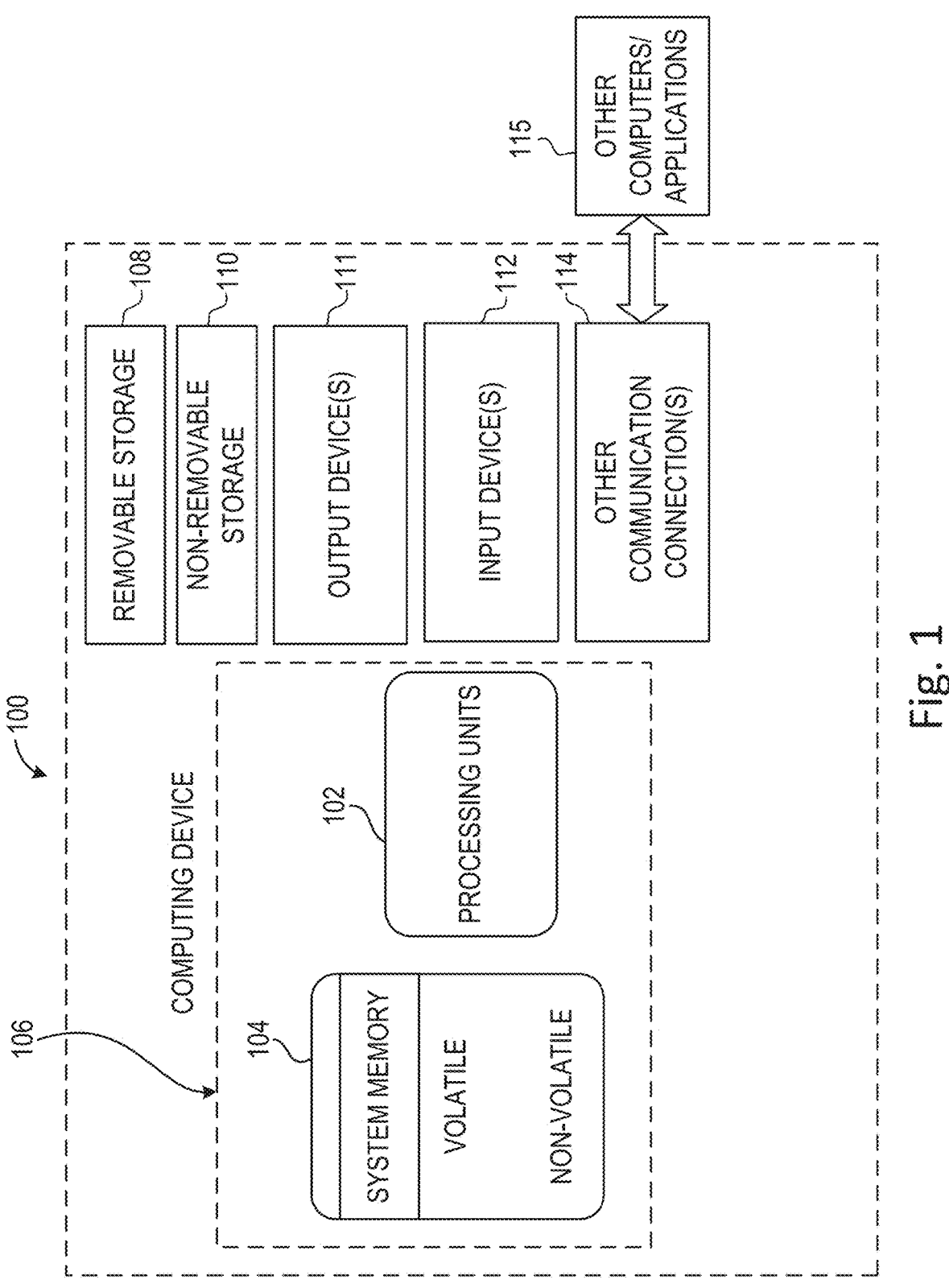
FIG. 1 is a block diagram illustrating an example of a computing device, which can be configured in a computer network to provide, for example, a screen sharing session via a communication service.

FIG. 1 illustrates an exemplary computer system that can be employed in an operating environment and used to host or run a computer application included on one or more computer readable storage mediums storing computer executable instructions for controlling the computer system, such as a computing device, to perform a process. The exemplary computer system includes a computing device, such as computing device 100. The computing device 100 can take one or more of several forms. Such forms include a tablet, a personal computer, a workstation, a server, a handheld device, a consumer electronic device (such as a video game console or a digital video recorder), or other, and can be a stand-alone device or configured as part of a computer network.

In a basic hardware configuration, computing device 100 typically includes a processor system having one or more processing units, i.e., processors 102, and memory 104. By way of example, the processing units may include two or more processing cores on a chip or two or more processor chips. In some examples, the computing device can also have one or more additional processing or specialized processors (not shown), such as a graphics processor for general-purpose computing on graphics processor units, to perform processing functions offloaded from the processor 102. The memory 104 may be arranged in a hierarchy and may include one or more levels of cache. Depending on the configuration and type of computing device, memory 104 may be volatile (such as random access memory (RAM)), non-volatile (such as read only memory (ROM), flash memory, etc.), or some combination of the two.

Computing device 100 can also have additional features or functionality. For example, computing device 100 may also include additional storage. Such storage may be removable or non-removable and can include magnetic or optical disks, solid-state memory, or flash storage devices such as removable storage 108 and non-removable storage 110. Computer storage media includes volatile and nonvolatile, removable and non-removable media implemented in any suitable method or technology for storage of information such as computer readable instructions, data structures, program modules or other data. Memory 104, removable storage 108 and non-removable storage 110 are all examples of computer storage media. Computer storage media includes RAM, ROM, EEPROM, flash memory or other memory technology, CD-ROM, digital versatile discs (DVD) or other optical storage, magnetic cassettes, magnetic tape, magnetic disk storage or other magnetic storage devices, universal serial bus (USB) flash drive, flash memory card, or other flash storage devices, or any other storage medium that can be used to store the desired information and that can be accessed by computing device 100. Accordingly, a propagating signal by itself does not qualify as storage media. Any such computer storage media may be part of computing device 100.

Computing device 100 often includes one or more input and/or output connections, such as USB connections, display ports, proprietary connections, and others to connect to various devices to provide inputs and outputs to the computing device. Input devices 112 may include devices such as keyboard, pointing device (e.g., mouse, track pad), stylus, voice input device, touch input device (e.g., touchscreen), or other. Output devices 111 may include devices such as a display, speakers, printer, or the like.

Computing device 100 often includes one or more communication connections 114 that allow computing device 100 to communicate with other computers/applications 115. Example communication connections can include an Ethernet interface, a wireless interface, a bus interface, a storage area network interface, and a proprietary interface. The communication connections can be used to couple the computing device 100 to a computer network, which can be classified according to a wide variety of characteristics such as topology, connection method, and scale. A network is a collection of computing devices and possibly other devices interconnected by communications channels that facilitate communications and allows sharing of resources and information among interconnected devices. Examples of computer networks include a local area network, a wide area network, the internet, or other network. In one example, one or more of computing device 100 can be configured as a client device for a user in the network. The client device can be configured to establish a remote connection with a server on a network in a computing environment. The client device can be configured to run applications or software such as operating systems, web browsers, cloud access agents, terminal emulators, or utilities.

In one example, one or more of computing devices 100 can be configured as servers in a datacenter to provide distributed computing services such as cloud computing services. A data center can provide pooled resources on which customers or tenants can dynamically provision and scale applications as needed without having to add servers or additional networking. The datacenter can be configured to communicate with local computing devices such used by cloud consumers including personal computers, mobile devices, embedded systems, or other computing devices. Within the data center, computing device 100 can be configured as servers, either as stand alone devices or individual blades in a rack of one or more other server devices. One or more host processors, such as processors 102, as well as other components including memory 104 and storage 110, on each server run a host operating system that can support multiple virtual machines. A tenant may initially use one virtual machine on a server to run an application. The datacenter may activate additional virtual machines on a server or other servers when demand increases, and the datacenter may deactivate virtual machines as demand drops.

The computing device 100 can include an operating system, or system software that manages the hardware and software resources of the computing device and can provide for common services for computer programs. The operating system can be implemented as computer executable instructions stored in a computer readable storage device, such as memory 104 and storage 110, to control the processor 102 to perform various tasks and include various features. An operating system can include a kernel to provide the most basic level of control over the components of the computing device 100. The kernel manages memory access for programs in the memory 104, it determines which programs get access to which hardware resources, it sets up or resets the operating states of the processor for operation, and it organizes the data for long-term non-volatile storage such as in storage 110 with file systems. The operating system provides an interface between an application program and the computing device 100 hardware, so that an application program can interact with the hardware by obeying rules and procedures programmed into the operating system. The operating system provides also a set of services that simplify execution of application programs. Executing an application program involves the creation of a process by the operating system kernel that assigns memory space and other resources, establishes a priority for the process in multi-tasking systems, loads program binary code into memory such as memory 104, and initiates execution of the application program which then interacts with the user and with hardware devices. The operating system may support a variety of networking protocols, communication hardware, and applications for using them. Often, computing devices 100 running dissimilar operating systems can participate in a common network for sharing resources such as computing, files, printers, and scanners using either wired or wireless connections. Computer networks can allow an operating system to access the resources of a remote computer to support the same functions as it could if those resources were connected directly to the local computer, which can include simple communication, using networked file systems or sharing graphics or sound hardware of another computing device.

The computing device 100 via the operating system can implement a user interface. The user interface can be referred to as a shell and supports human interaction. The user interface views the directory structure and requests services from the operating system that will acquire data from input devices 112, such as the keyboard or mouse, and requests operating system services to display prompts, status messages and such on output devices 111, such as a video monitor or printer. The two most common forms of a user interface have historically been the command-line interface, where computer commands are typed out line-by-line, and the graphical user interface (GUI), where a visual environment is present. In one example, a GUI can be configured in the style of interaction as a WIMP (for instance, windows, icons, menus, pointer). An operating system may implement an interface schema such as a desktop environment, which is an implementation of programs running on top of the operating system that share a common GUI.

On a computing device that offers a desktop environment, a window manager in conjunction with applications written using a widget toolkit are generally responsible for most of what is presented on the desktop environment. The window manager supports the user interactions with the environment, while the toolkit provides developers a software library for applications with a unified look and behavior. A windowing system can interface directly with the underlying operating system and libraries to provide support for graphical hardware, pointing devices, and keyboards. The window manager generally runs on top of this windowing system. Applications that are created with a particular window manager in mind usually make use of a windowing toolkit, generally provided with the operating system or window manager. A windowing toolkit gives applications access to widgets that allow the user to interact graphically with the application in a similar way.

The operating system, or another program, can be used to implement a virtual desktop or multiple virtual desktops. Virtual desktop is a term used with respect to user interfaces, usually within the WIMP paradigm, to describe ways in which the virtual space of the desktop environment is expanded beyond the physical limits of a display area through the use of software. There are two major approaches to expanding the virtual area of the screen. Switchable virtual desktops allow the user to make virtual copies of their desktop view-port and switch between them, with open windows existing on single virtual desktops. Another approach is to expand the size of a single virtual screen beyond the size of the physical viewing device. Typically, scrolling or panning a subsection of the virtual desktop into view is used to navigate an oversized virtual desktop. Virtual desktop managers are available for most graphical user interface operating systems and offer various features, such as placing different wallpapers for each virtual desktop and use of hotkeys or other convenient methods to allow the user to switch among the different desktop environments.

Screen sharing applications can be implemented as computer executable instructions stored in a computer readable storage device, such as memory 104 and storage 110, to control the processor 102. A screen sharing application can be configured as a standalone application, as part of a computer network communication application, or as a feature of an operating system or other application. In one example, a screen sharing application can establish a screen sharing session between a local computing device and a remote computer device, including a plurality of remote computer devices, in which an image or functionality of a screen or desktop environment of the local computing device is provided to a remote computing device. The remote computing device may than display the desktop environment of the local computing device onto a monitor of the remote computing device. In some examples, a user of the remote computing device may navigate or operate through windows or applications of the desktop environment and collaborate with the shared desktop environment or save images, such as take screen shots, of the displayed desktop environment via features of the screen sharing or communication application, features of the operating system, or other applications.

Screen sharing applications, particularly when used with users outside an enterprise or with users without sufficient permissions to resources, may pose privacy and security concerns. When a user of a screen sharing application shares their desktop environment and opens applications the user can inadvertently reveal which applications they have open in the desktop environment. Sometimes, accidental opening of a mail or spread sheet or presentation or browser may result in serious consequences both monetary or security. The other users not entitled to information can get the information and without the knowledge or approval of screen sharer. The other user can take screen shots of accidental content being presented and may use for any other unintended purposes such as posting online. In many circumstances, users of screen sharing programs attempt to become vigilant and close windows, documents, or applications with sensitive information prior to a screen sharing session. Subsequent to the screen sharing session, however, the user may lose track of progress or consume time to return to the windows, documents, or applications with sensitive information.

Figure 2A:
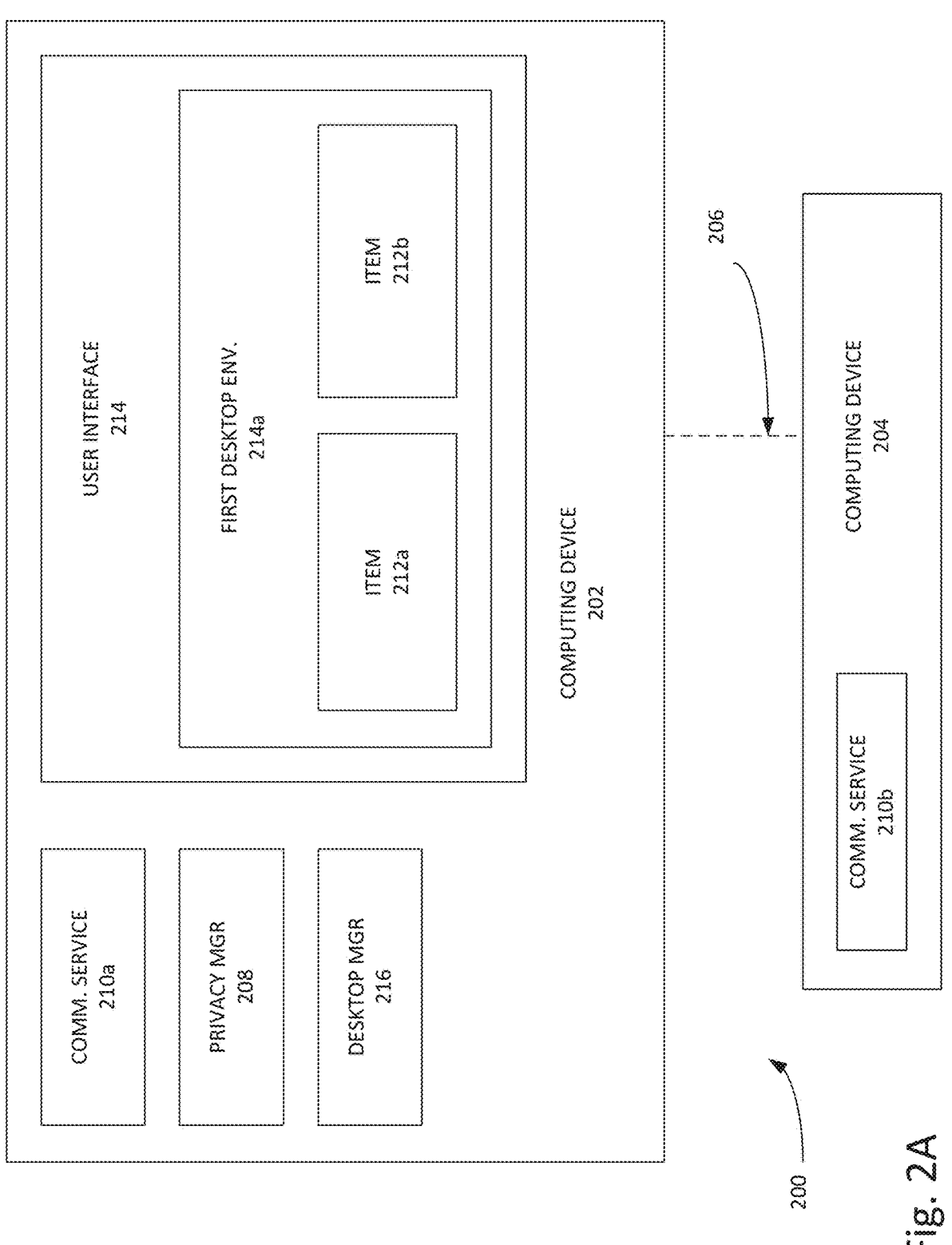
FIG. 2A is a block diagram illustrating an example environment of a computer network having a screen sharing session privacy manager that can be implemented with the computing device of FIG. 1.
Figure 2B:
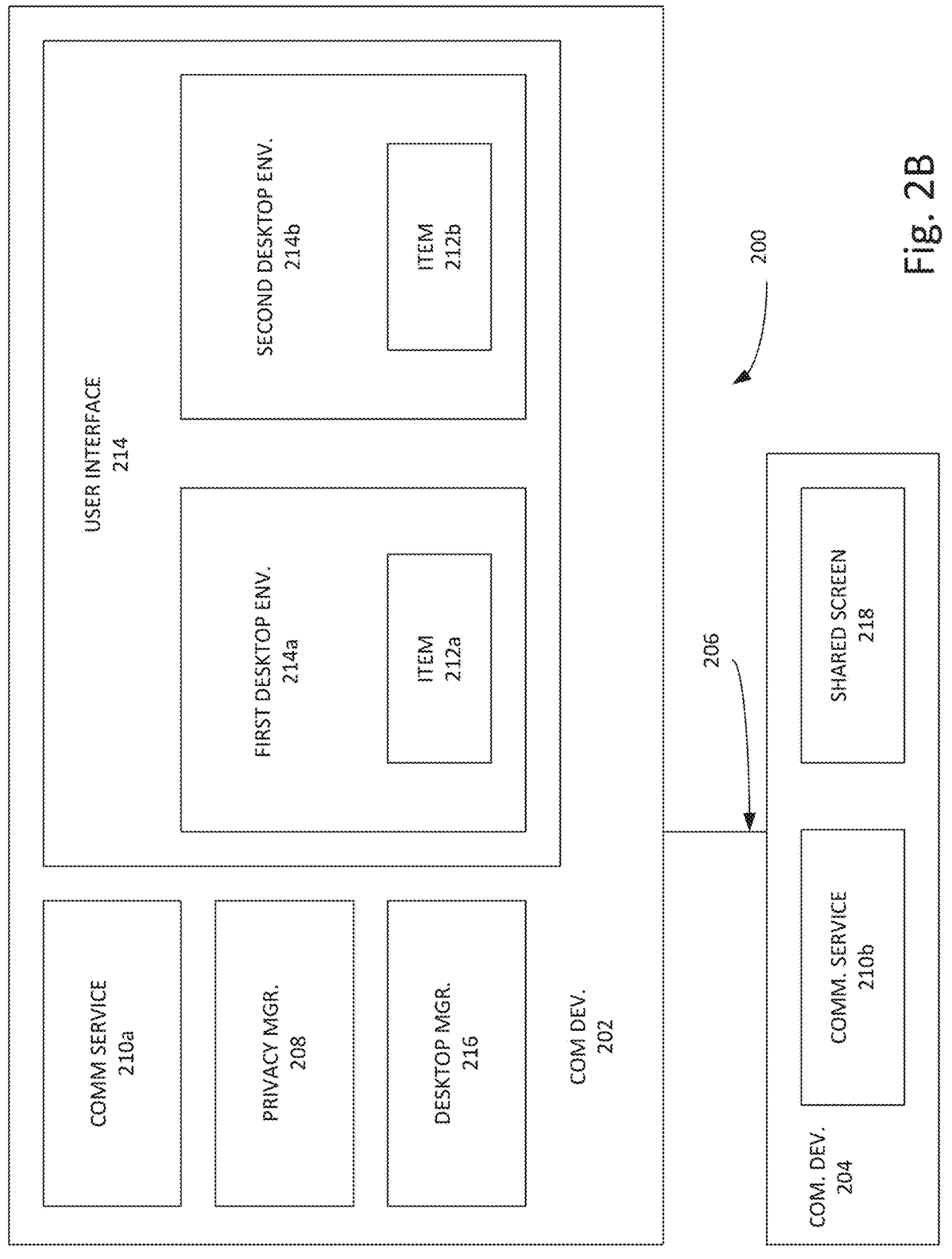
FIG. 2B is a block diagram illustrating an example environment of a computer network having a screen sharing session privacy manager in a screen sharing session that can be implemented with the computing device of FIG. 1.

FIGS. 2A and 2B illustrate an example operating environment 200 with a plurality of computer devices 202, 204 operably coupled together over a computer network 206 to establish a screen sharing session with a screen sharing session privacy manager 208, or privacy manager 208. In the illustrated example, the screen sharing session can be established over the network 206 via communication service 210, such as client applications 210*a*, 210*b* to share items 212 on a user interface 214 of a first computing device 202 with a second computing device 204. Additionally, the illustrated example includes a virtual desktop manager 216 operably coupled to the privacy manager 208. In one example, the privacy manager 208, communication service 210*a*, and virtual desktop manager 216 are implemented via programs running on computing device 202.

In one example, the communication service 210 can include client applications 210*a*, 210*b* to implement a cloud-based service. Other examples can include hybrid peer-to-peer services and client-server system or web applications that are implemented via a browser running on the computing device. The communication service 210 can be a multi-feature telecommunications application that permits users of computing devices 202, 204 to communicate over a network 206 such as the internet via voice, video, instant messaging, and screen sharing. In a screen sharing feature of the communication service 210, a screen sharing session is established via the computer network 206 the contents of a user interface 214 such as items 212 on desktop of, for example, computing device 202 are shared so that other computing devices in the screen sharing session, such as computing device 204, can view the user interface 214 of computing device 202. In some examples, the communication service 210 can provide for remote desktop control to allow computing device 204 to manipulate the items 212 on user interface 214. After a screen sharing session is terminated, the items 212 on user interface 214 on computing device 202 are no longer viewable on computing device 204.

FIG. 2A illustrates an example in which computing device 202 is about to establish a screen sharing session with computing device 204 over network 206 via communication service 210 to share contents of user interface 214 such as items 212. In one example, the computing devices 202, 204 are already in a video conference or audio conference via communication service 210 over network 206 but have not established a screen sharing session. In still another example, the computing devices 202, 204, have not established a communication session. In this example, the items 212 of user interface include item 212a and 212b in which item 212a is a document open in a first application that does not include sensitive information and item 212b is a document open in a second application that does include sensitive information. For example, item 212a can be a presentation that includes subject matter relevant to the screen sharing session whereas item 212b may be a spreadsheet with sensitive financial information that a user of computing device 202 is preparing for a project unrelated to the screen sharing session. In the example, the items 212a, 212b are both on a user interface 214 that includes a first desktop environment 214a, such as first virtual desktop environment 214a. In one example, the first virtual desktop environment 214a is presented on a monitor or display operably coupled to the computing device 202.

FIG. 2B illustrates an example in which computing device 202 is has established a screen sharing session with computing device 204 over network 206 via communication service 210 to share contents of user interface 214a. Privacy manager 208 has caused virtual desktop manager 216 to hide the sensitive item 212b from the screen sharing session so that sensitive item 212b is not available, or is in accessible to view and manipulate, to computing device 204. Further, the application associated with sensitive item 212b remains running on computing device 202 and the item 212b remains open and is not closed and the application is not terminated. In the example, the virtual desktop manager 216 has created a second desktop environment 214b and has moved the running application and open sensitive item 212b to second desktop environment 214b. Computing device 202 only provides the contents of the first desktop environment 214a in the established screen sharing session, such as shared screen 218, to computing device 204. Share screen 218 includes only items on the first desktop environment, such as item 212a, does not include sensitive items 212b on the second desktop environment 214b and may not include an indication that the second desktop environment 214b is on computing device 202.

In one example, the first desktop environment 214a is viewable, such as in a primary monitor coupled to computing device 202 and the second desktop environment 214b is hidden from view on the primary monitor and is inaccessible to the screen sharing session and computing device 204. In another example, the second desktop environment 214b is viewable, such as on a second monitor or selectably viewable on the primary monitor, but is otherwise inaccessible to the screen sharing session and computing device 204. In some examples, the first and second desktop environments 214a, 214b can be selected for view on the primary monitor. In examples in which the computing device 202 has established multiple desktop environments prior to the screen sharing session, the privacy manager causes the virtual desktop manager 216 to open an additional desktop environment and moves the running application and open sensitive item 212b to the additional desktop environment. In one example, upon termination of the screen sharing session, the privacy manager 208 may cause the sensitive item 212b to be returned to the first desktop environment 214a, and the virtual desktop manager 216 to close the second desktop environment 214b. In one example, the virtual desktop manager 216 operates as a module within an operating system and the privacy manager 208 operates as a module within the communication application. In another example, the virtual desktop manager 216 and privacy manager 208 are features within the operating system.

Figure 3:
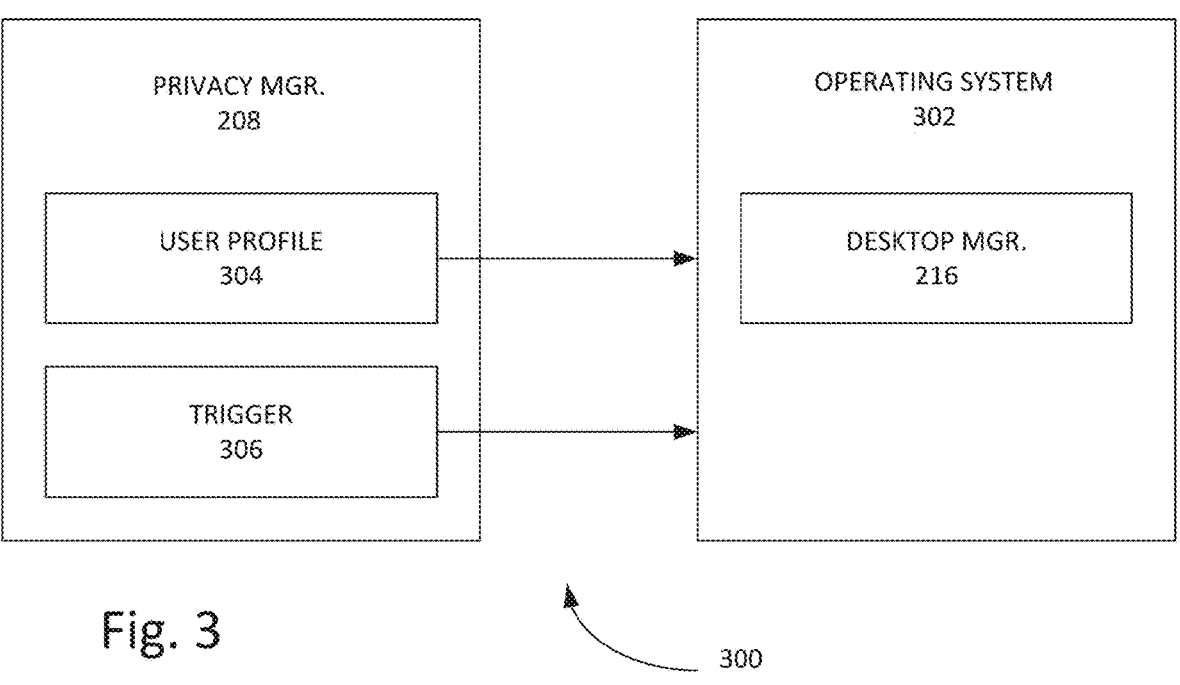
FIG. 3 is a block diagram illustrating an example system of the screen sharing session privacy manager of FIG. 2.

FIG. 3 illustrates an example system 300 having an example privacy manager 208 operably coupled to a virtual desktop manager 216, such as a virtual desktop manager module of an operation system 302 for use with computing device 202. In one example, the privacy manager 208 can be incorporated into the operating system 302, into the communication service 210, or a standalone product. The privacy manager 208 can include a user profile 304 that may be applied to identify sensitive items to be hidden in a screen sharing session. The privacy manager 208 can also include a screen sharing session trigger 306 that can identify to the virtual desktop manager 216 whether a screen sharing session has been established and, in some examples, whether the established screen sharing session has been terminated. The privacy manager 208 can receive signals from the communication service 210 to determine whether a screen sharing session is initiated. The privacy manager 208 and the virtual desktop manager 216 module of the operating system 302 can be implemented as a program running on a system, such as a computing device 100 having a processor and memory that may be configured as computing device 202 in environment 200. In particular, the privacy manager 208 and the virtual desktop manager 216 module of the operating system 302 can be implemented as computer executable instructions stored on a computer readable storage device, such as memory 104 or storage 110, to control a processor 102, such as a processor of computing device 202. The computer readable instructions stored in the computer readable device can cause the processor to hide sensitive items based on the user profile 304 upon the establishment of the screen sharing session based upon screen sharing session trigger 306 and, in some examples, merge the sensitive items (items 212b) with items presented in the screen sharing session (items 212a) upon termination of the screen sharing session based upon the screen sharing session trigger 306.

The user profile 304 may be associated with a particular computing device, such as computing device 202, or a particular user account. In the case of the user profile 304 associated with a user account, the user profile 304 may be used with various computing devices that can be used to access the user account, such as a user in an enterprise. The user profile 304 may include a data structure that can store identified sensitive items 212b such as particular files, types of files or documents, categories of files or documents, files or documents related to a particular application, or catego-ries of applications. In some examples, the user profile 304 may include additional information as to conditions in which the items identified on the sensitive list are to be hidden, such as whether the items are sensitive in circumstances where the screen sharing session is established with users outside of the enterprise, or with those with weak permis-sions. In one example, an item on the list is deemed a sensitive item to be moved if the item meets the associated conditions, if any conditions are attached. Upon an attempt to establish a screen sharing session, screen sharing session trigger 306 may review whether items identified in the user profile 304 are open and running or otherwise accessible in the screen sharing session, determine whether the open or running items identified in the user profile 304 are sensitive items, and prompt a user of computing device 202 as to whether to hide sensitive items on the first desktop envi-ronment 214a or can automatically hide sensitive items on the first desktop environment 214a, such automatically generate a second desktop environment 214b via virtual desktop manager 216 that is inaccessible to the screen sharing.

In one example, privacy manager 208 can include a machine learning model to learn whether to add sensitive items to the user profile 304. For example, the privacy manager 208 may learn from the prompts as to whether to hide items identified in the user profile should remain in the user profile, or whether the items can be further specified, such as particular files from applications identified in the user profile. For example, a user may select to hide all word processing documents from screen sharing sessions in user profile, but a user then continuously opens certain word processing documents during a screen sharing session to share with other users. The machine learning model may modify the user profile to include some word processing documents to hide and not others based on determined conditions. The machine learning model or user profile could be based on the participants in the screen sharing session as well. For example, certain documents may be hidden from participants with lower permissions or those outside of the enterprise, whereas the documents may remain in the shared desktop environment of those with similar permissions or similar roles within the enterprise. In one example, the machine learning model can implement the Bayes theorem to determine the likelihood a user of com-puting device 202 will hide an item, such as an application or file, prior to a screen sharing session.

The virtual desktop manager 216 can be configured to open a new, or second desktop environment 214b, and to move sensitive items identified in the user profile 304 into the second desktop environment, which is not accessible in a screen sharing session, upon activation by the screen sharing session trigger 306. In some examples, the user may move additional items into the second desktop environment 214b from the first desktop environment 214a, including other desktop environments, and may move items from the second desktop environment 214b to the first desktop envi-ronment 214b during the screen sharing session. Addition-ally, the virtual desktop manager 216 can move items move items from the second desktop environment 214b to the first desktop environment 214b and close the second desktop environment 214b after the screen sharing session is termi-nated.

Figure 4:
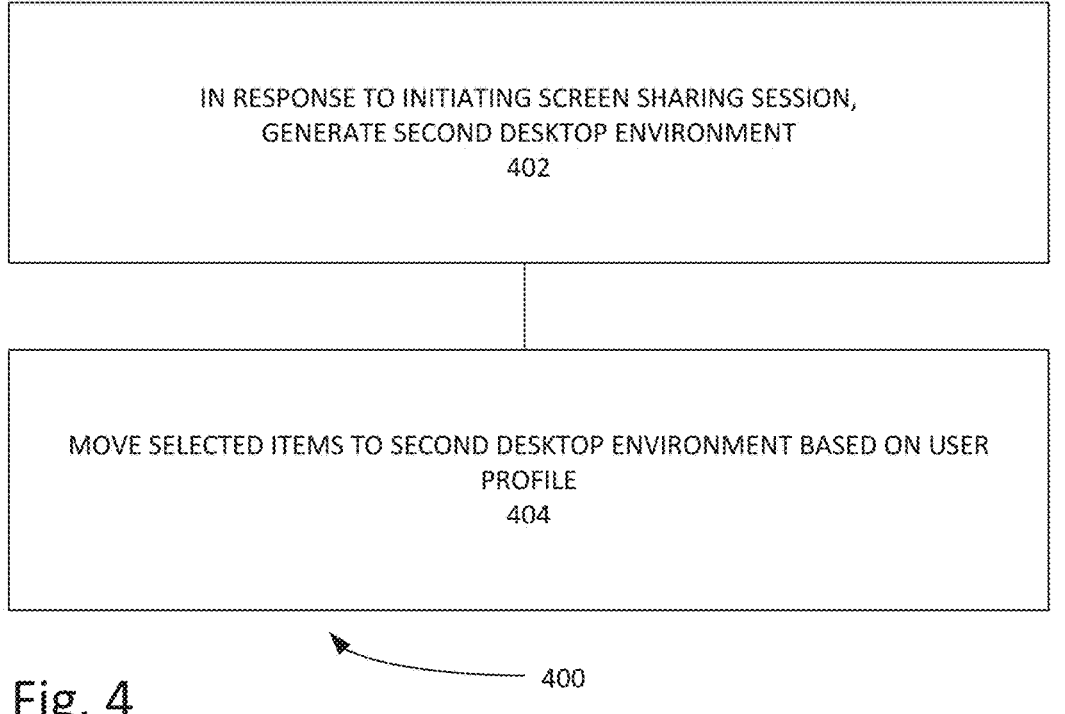
FIG. 4 is a block diagram illustrating an example method of the system of FIG. 3.

FIG. 4 illustrates a method 400 performed with or assisted by the privacy manager 208 and the virtual desktop manager 216 on a computing device, such as computing device 202 that can implement a communication service 210 to share a screen, such as a first desktop environment 214a with a remote computing device 204 in a screen sharing session over a network 206. In response to a screen sharing session of the first desktop environment 214a being established, such as initiating a screen sharing session or before the first desktop environment 214a is shared with the remote com-puting device 204 over the network, a second desktop environment 214b is generated and is made inaccessible to the screen sharing session at 402. Selected items 212b of the first desktop environment 214a are moved into the second desktop environment 214b based on a user profile 304, at 404. In the example, method 400 is implemented automati-cally as a program running on a system, such as a computing device 100 having a processor and memory that may be configured as computing device 202 in environment 200. For example, method 400 is implemented as computer executable instructions stored on a computer readable stor-age device, such as memory 104 or storage 110, to control a processor 102, such as a processor of computing device 202.

In one example, a user of computing device 202 accesses a screen sharing feature of communication service 210 via an interface or menu in client application of communication service 210a. This activates the privacy manager 208 to determine which items 212 are open on the first desktop environment 214a or whether items 212 open on the first desktop environment 214a correspond with items listed in the user profile 304. If no items 212 open on first desktop environment 214a correspond with items listed in the user profile 304, or if the identified items do not meet the conditions of sensitivity as determined from such factors as the participants of the screen sharing session, the privacy manager 208 may issue a notice on the first desktop envi-ronment 214a that a screen sharing session may be safely established. If, however, items 212b open on first desktop environment 214a correspond with items listed in the user profile 304, or if the identified items meet the conditions of sensitivity in the user profile 304, the privacy manager 208 may provide a prompt offering to or generate a second desktop environment 214b that is inaccessible to the screen sharing session at 402. The selected items 212b of the first desktop environment 214a deemed sensitive are moved into the second desktop environment 214b at 404 via the virtual desktop manager 216, which may be a feature of the operating system 302. In the example, items 212a not deemed sensitive, such as items not listed in the user profile or items specifically marked as not sensitive in the user profile, remain in the first desktop environment 214a. Once the sensitive items 212b are moved to the second desktop environment 214b, a screen sharing session of the first desktop environment 214a is initiated, with communication service 210, via computing device 204 over network 206 to share the screen 218 of the first desktop environment 214a. For example, the privacy manager 208 can signal the com-munication service 210 to begin the screen sharing session. In some examples, the privacy manager 208 can update or amend the user profile 304 based on the whether an item 212 is moved into the second desktop environment 214b. For example, a machine learning model can be applied to whether an item 212 is moved into the second desktop environment 214b.

In one example, the item 212b in the second desktop environment 214b can remain running or open in the second desktop environment 214*b* as otherwise accessible to a user on computing device 202, such as a user can continue to work on the item 212*b*. The second desktop environment 214*b* and its items 212*b* are, however, not accessible in the screen sharing session to communication service 210 or computing device 204 such as in shared screen 218. In some examples, the second desktop environment 214*b* is not displayed and is not accessible to a user of the computing device 202 during the screen sharing session or until the screen sharing session has ended.

In response to ending the screen sharing session, such as termination the communication with the computing device 204 or termination the screen sharing feature of communication service 210, the selected item 212*b* can be moved back to the first desktop environment 214*a*, such as the second desktop environment 214*b* is merged with the first desktop environment 214*a*, and the second desktop environment 214*b* is closed. For example, the privacy manager 208 can receive a signal from the communication service 210 that the screen sharing session has terminated, and the operating system 302 can merge the desktop environments 214*a*, 214*b* based on a signal from the privacy manager 208.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein.

What is claimed is:

1. A method implemented by a computing system, the method comprising:

initiating a screen sharing session between a first computing device and a second computing device on a computer network, wherein the screen sharing session is configured to share a first desktop environment of an operating system on the first computing device with the second computing device;

in response to creation of the first desktop environment, generating a second desktop environment with the operating system, wherein the second desktop environment is inaccessible to the screen sharing session; and based at least on a user profile, which indicates that a selected item in the first desktop environment satisfies a condition, moving the selected item from the first desktop environment, which is displayed in a first region of a user interface, to the second desktop environment, which is displayed in a second region of the user interface, wherein the second region is different from the first region.

2. The method of claim 1, wherein initiating the screen sharing session comprises:

initiating the screen sharing session between the first computing device and the second computing device on the computer network after the first desktop environment and the second desktop environment are generated.

3. The method of claim 1, wherein initiating the screen sharing session comprises:

initiating the screen sharing session between the first computing device and the second computing device on the computer network after the first desktop environment is displayed in the first region of the user interface and after the second desktop environment is displayed in the second region of the user interface.

4. The method of claim 1, wherein moving the selected item from the first desktop environment to the second desktop environment comprises:

based at least on the user profile indicating that the selected item in the first desktop environment is a predetermined sensitive item, moving the selected item from the first desktop environment, which is displayed in the first region of the user interface, to the second desktop environment, which is displayed in the second region of the user interface.

5. The method of claim 1, wherein initiating the screen sharing session comprises:

initiating the screen sharing session between the first computing device and the second computing device on the computer network after the selected item is moved from the first desktop environment to the second desktop environment.

6. The method of claim 1, wherein moving the selected item from the first desktop environment to the second desktop environment comprises:

based on the user profile, hiding the selected item from the screen sharing session by moving the selected item from the first desktop environment, which is displayed in the first region of the user interface, to the second desktop environment, which is displayed in the second region of the user interface.

7. The method of claim 1, further comprising:

as a result of ending the screen sharing session, moving the selected item from the second desktop environment, which is displayed in the second region of the user interface, to the first desktop environment, which is displayed in the first region of the user interface.

8. The method of claim 1, further comprising:

as a result of ending the screen sharing session, merging the first desktop environment and the second desktop environment.

9. A computer program product comprising a computer-readable storage medium having instructions recorded thereon that, when executed, cause a processor-based system to perform operations, the operations comprising:

generating a first desktop environment with an operating system on a first computing device, which includes causing the first desktop environment to be displayed in a first region of a user interface;

generating a second desktop environment with the operating system, which includes causing the second desktop environment to be displayed in a second region of the user interface, wherein the second region is different from the first region;

after the first desktop environment is displayed in the first region of the user interface and after the second desktop environment is displayed in the second region of the user interface, initiating a screen sharing session between the first computing device and a second computing device on a computer network, wherein the screen sharing session is configured to share the first desktop environment on the first computing device with the second computing device, wherein the second desktop environment is inaccessible to view in the screen sharing session; and based at least on a user profile, which indicates that a selected item in the first desktop environment satisfies a condition, moving the selected item from the first desktop environment, which is displayed in the first region of the user interface, to the second desktop environment, which is displayed in the second region of the user interface.

10. The computer program product of claim 9, wherein the operations comprise:

based on the user profile, hiding the selected item from the screen sharing session by moving the selected item from the first desktop environment, which is displayed in the first region of the user interface, to the second desktop environment, which is displayed in the second region of the user interface.

11. The computer program product of claim 10, wherein the operations comprise:

based on the user profile, automatically hiding the selected item from the screen sharing session by moving the selected item from the first desktop environment, which is displayed in the first region of the user interface, to the second desktop environment, which is displayed in the second region of the user interface.

12. A system comprising:

a processor system; and a memory that stores computer-executable instructions that, when executed, cause the processor system to at least:

initiate a screen sharing session between a first computing device and a second computing device on a computer network, wherein the screen sharing session is configured to share a first desktop environment of an operating system on the first computing device with the second computing device;

in response to creation of the first desktop environment, generate a second desktop environment with the operating system, wherein the second desktop environment is inaccessible to the screen sharing session; and based at least on a user profile, which indicates that a selected item in the first desktop environment satisfies a condition, move the selected item from the first desktop environment, which is displayed in a first region of a user interface, to the second desktop environment, which is displayed in a second region of the user interface, wherein the second region is different from the first region.

13. The system of claim 12, wherein the computer-executable instructions are executable by the processor system to at least:

initiate the screen sharing session between the first computing device and the second computing device on the computer network after the first desktop environment and the second desktop environment are generated.

14. The system of claim 12, wherein the computer-executable instructions are executable by the processor system to at least:

initiate the screen sharing session between the first computing device and the second computing device on the computer network after the first desktop environment is displayed in the first region of the user interface and after the second desktop environment is displayed in the second region of the user interface.

15. The system of claim 12, wherein the computer-executable instructions are executable by the processor system to at least:

based at least on the user profile indicating that the selected item in the first desktop environment is a predetermined sensitive item, move the selected item from the first desktop environment, which is displayed in the first region of the user interface, to the second desktop environment, which is displayed in the second region of the user interface.

16. The system of claim 12, wherein the computer-executable instructions are executable by the processor system to at least:

initiate the screen sharing session between the first computing device and the second computing device on the computer network after the selected item is moved from the first desktop environment to the second desktop environment.

17. The system of claim 12, wherein the computer-executable instructions are executable by the processor system to at least:

based on the user profile, hide the selected item from the screen sharing session by moving the selected item from the first desktop environment, which is displayed in the first region of the user interface, to the second desktop environment, which is displayed in the second region of the user interface.

18. The system of claim 17, wherein the computer-executable instructions are executable by the processor system to at least:

based on the user profile, automatically hide the selected item from the screen sharing session by moving the selected item from the first desktop environment, which is displayed in the first region of the user interface, to the second desktop environment, which is displayed in the second region of the user interface.

19. The system of claim 12, wherein the computer-executable instructions are executable by the processor system further to at least:

as a result of ending the screen sharing session, move the selected item from the second desktop environment, which is displayed in the second region of the user interface, to the first desktop environment, which is displayed in the first region of the user interface.

20. The system of claim 12, wherein the computer-executable instructions are executable by the processor system further to at least:

as a result of ending the screen sharing session, merge the first desktop environment and the second desktop environment.

* * * * *